United States Patent [19]
Makino et al.

[11] Patent Number: 5,998,041
[45] Date of Patent: Dec. 7, 1999

[54] JOINED ARTICLE, A PROCESS FOR PRODUCING SAID JOINED ARTICLE, AND A BRAZING AGENT FOR USE IN PRODUCING SUCH A JOINED ARTICLE

[75] Inventors: Takuma Makino, Nagoya; Masayuki Shinkai, Ama-Gun, both of Japan

[73] Assignee: NGK Insulators, Ltd., Japan

[21] Appl. No.: 08/820,350

[22] Filed: Mar. 12, 1997

[30] Foreign Application Priority Data

Mar. 12, 1996 [JP] Japan ................................ 8-081954

[51] Int. Cl.$^6$ .................................................. B21D 39/00
[52] U.S. Cl. ........................ 428/621; 428/627; 428/680; 428/939; 420/441; 420/443; 228/121; 228/122.1; 228/124.5
[58] Field of Search .................................. 428/627, 649, 428/680, 674, 650, 939, 621; 228/122.1, 903, 124.5, 121; 420/441, 443, 528

[56] References Cited

U.S. PATENT DOCUMENTS

| | | | |
|---|---|---|---|
| 3,337,334 | 8/1967 | Fenn et al. ................................ | 75/150 |
| 3,344,505 | 10/1967 | Rively et al. .......................... | 29/473.1 |
| 3,715,206 | 2/1973 | Komatsu et al. ......................... | 75/170 |
| 3,776,472 | 12/1973 | Lock et al. .............................. | 239/591 |
| 3,790,371 | 2/1974 | Karlyn ..................................... | 75/170 |
| 4,040,822 | 8/1977 | Stern ........................................ | 75/140 |
| 4,447,283 | 5/1984 | Ebata et al. ............................. | 156/325 |
| 4,448,853 | 5/1984 | Fischer et al. .......................... | 428/607 |
| 4,472,035 | 9/1984 | Takamura et al. ........................ | 351/41 |
| 4,556,534 | 12/1985 | Burnett et al. ........................... | 420/445 |
| 4,785,092 | 11/1988 | Nanba et al. ............................ | 420/540 |
| 5,013,612 | 5/1991 | Hunt et al. ............................... | 428/552 |
| 5,400,946 | 3/1995 | Weise et al. .......................... | 228/122.1 |
| 5,551,997 | 9/1996 | Marder et al. .......................... | 148/437 |
| 5,598,966 | 2/1997 | Romano et al.. .................... | 228/124.6 |

FOREIGN PATENT DOCUMENTS

| | | |
|---|---|---|
| 2 055 657 | 5/1972 | Germany . |
| 479 084 | 1/1938 | United Kingdom . |

*Primary Examiner*—Paul Thibodeau
*Assistant Examiner*—Holly Rickman
*Attorney, Agent, or Firm*—Parkhurst & Wendel, L.L.P.

[57] ABSTRACT

A joined article includes a ceramic member, another member, and a joining layer which is formed between the ceramic member and another member and joins both the members together, wherein the joining layer is composed mainly of nickel, and the joining layer contains beryllium as an activating component.

10 Claims, 2 Drawing Sheets

FIG_1

JOINED ARTICLE, A PROCESS FOR PRODUCING SAID JOINED ARTICLE, AND A BRAZING AGENT FOR USE IN PRODUCING SUCH A JOINED ARTICLE

BACKGROUND OF THE INVENTION (1) Field of the Invention

The present invention relates to a joined article, a process for producing said joined article, and a brazing agent for use in producing such a joined article.

(2) Related Art of the Invention

Since aluminum nitride has high heat conductivity, high electric insulation property, low thermal expansion, a low dielectric constant, etc., aluminum nitride has been widely used in various ways, for example, as a substrate material for high output semiconductor elements. In particular, various constructions of joined articles composed of aluminum nitride members and ceramic members and joined articles composed of aluminum nitride members and metallic members have been used in various ways. For example, as to ceramic heaters, electrostatic chucks, high frequency electrodes, etc. to be used in the semiconductor producing apparatuses, joining needs to be effected between aluminum nitride members and various ceramic members, between aluminum nitride members and tools for setting thermocouples, between aluminum nitride members and electrodes.

In order to join a ceramic member to a metallic member, it has been heretofore known that a brazing material is interposed between the ceramic member and the metallic member, and both the members are joined together by melting the brazing material under heating. However, although a number of brazing materials are known for metals, any of those brazing materials has poor wetting upon type ceramic members, particularly made of non-oxide type ceramic materials. Among them, it was difficult to firmly join the aluminum nitride member to the metallic member by brazing.

Under the circumstances, as a brazing material for joining a non-oxide type ceramic member to a metallic member or the like is used a brazing material containing an active metal such as titanium or zirconium for improving wettability of the brazing material. For example, according to "Joining between aluminum nitride and metals" (Yoshikuni NAKAO, "Light metal welding" vol. 31, 1993, No. 8, pp 359–365), it is known that various alloys including Ag—Cu based alloys and Ag—Cu—Ti based alloys have been tested as brazing materials for joining aluminum nitride to copper, and that titanium, zirconium, niobium, hafnium or vanadium is incorporated into the brazing materials made of the above alloys. Each of these active metals locally exists near the surfaces of the aluminum nitride members in such a manner that a reactive layer is formed in a thickness of a few to several $\mu$m.

However, the reaction layer composed of such an active metal may be converted to a brittle intermetallic compound with the result that joining strength decreases. In particular, the present inventors found out that the above active metals have not necessary sufficient corrosion resistance.

Specifically, a halogen based corrosive gas is used as an etching gas, a cleaning gas or the like in a semiconductor producing apparatus. The present inventors found out that when joined articles were produced by joining aluminum nitride members to metallic members by using various metallic brazing materials mentioned above, and the resulting joined articles were subjected to a test for exposing them to such a halogen based corrosive gas, the joined articles were rapidly corroded with the halogen based corrosive gas. As a result, since the gas is likely to leak from the joined interface of the joined article, such a joined article cannot be used in a situation in which gas tightness is is required. Further, joining strength of some joined articles remarkably dropped. Therefore, a brazing material is demanded, which can be favorably used as a brazing material for ceramic members and has improved wettability upon ceramics, particularly, non-oxide type ceramic materials, and possesses especially high corrosion resistance.

SUMMARY OF THE INVENTION

It is an object of the present invention to provide a brazing material having high wettability upon ceramic members, particularly non-oxide type ceramic members made of aluminum nitride or the like, a joined article using this brazing material, and a process for producing such a joined article.

Further, it is another object of the present invention to provide a joined article which has high corrosion resistance against various corrosive materials, particularly halogen based corrosive gases and which can maintain strength and gas-tightness of the joined article even if the joined article is use for a long time period.

The present invention relates to a joined article according to the present invention comprises a ceramic member, another member, and a joining layer which is formed between the ceramic member and said another member and joins both the members together, said joining layer being composed mainly of at least one kind of metals selected from the group consisting of copper, aluminum and nickel, and said joining layer containing beryllium as an activating component.

The present invention also relates to a process for producing a joined article, comprising the steps of interposing a brazing material between a ceramic member and another member, and joining both the members via the brazing material by heating, wherein said joining layer is composed mainly of at least one kind of metals selected from the group consisting of copper, aluminum and nickel, and said joining layer contains beryllium as an active component.

The present invention further relates to a brazing material for use in joining a ceramic member to another member, wherein said joining layer is composed mainly of at least one kind of metals selected from the group consisting of copper, aluminum and nickel, and said joining layer contains beryllium as an active component. The brazing material is preferably a brazing material having corrosion resistance against a halogen based corrosive gas.

According to the joined article-producing process and process of the present invention, the following are preferred.

(1) The ceramic member is joined to said another member under pressure by heating the brazing material at not more than a liquid phase liquid temperature of the brazing material.

(2) The ceramic member comprises a non-oxide type ceramic material.

(3) The said non-oxide type ceramic material is aluminum nitride.

(4) Said another member is nickel.

According to the present invention, as mentioned above, the joined strength of the joined article cannot only be enhanced because the brazing material is firmly joined to the ceramic member, but also the metallic member is much unlikely to be corroded because progressed corrosion along the interface between the joining layer and the ceramic member can be prevented.

These and other objects, features and advantages of the invention will be understood from the following description of the invention when taken in conjunction with the attached drawings, with the understanding that some modifications, variations and changes of the same could be easily made by the skilled person in the art to which the invention pertains.

BRIEF DESCRIPTION OF THE INVENTION

For a better understanding of the invention, reference is made to the attached drawings, wherein.

DETAILED DESCRIPTION OF THE INVENTION

Figure 1:
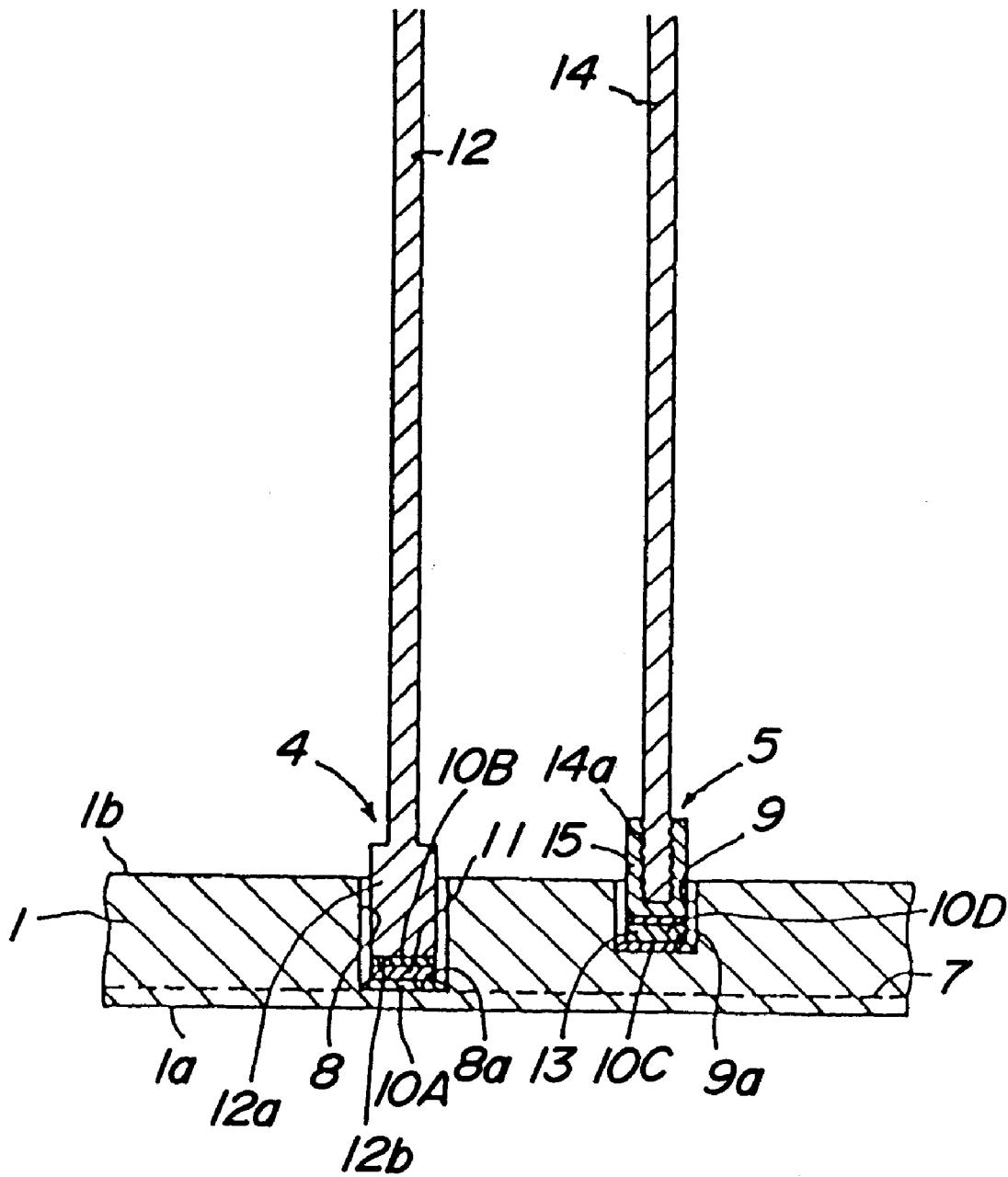
FIG. 1 is a sectional view for illustrating an electrostatic chucking body and a supporting structure therefor.

The present inventors conducted experiments for joining aluminum nitride members upon other members. First, they examined Ni—P brazing materials, Al—Cu brazing materials, Cu—Ni brazing material, etc., but all of them had poor wettability upon the surfaces of the aluminum nitride members. The inventors also examined a technique that the surface of an aluminum nitride member was plated with nickel, and then the Al—Cu brazing material was used thereon. However, this afforded no sufficient wettability upon the aluminum nitride member, either.

On the other hand, the inventors discovered that a brazing material produced by adding beryllium into copper has extremely excellent wettability upon the surface of the aluminum nitride member, and remarkably enhances the joining strength of the joined article. In addition, the inventors discovered that this joined article has extremely high corrosion resistance, and is unlikely to be corroded at a joined portion even if the joined article is contacted with a halogen based corrosive gas particularly at high temperatures. The present inventors have reached the present invention based on the above discoveries.

The main component of the brazing material is at least one kind of metals selected from the groups consisting of copper, aluminum and nickel. It is confirmed that if at least one kind of these metals is used as the main component, high corrosion resistance, particularly upon the halogen based corrosive gas can be obtained. The main component of the brazing material may be selected from the group consisting of copper, aluminum and nickel as mentioned above, or may be one of a metallic material selected from the group consisting of these metals and any alloys thereof.

Particularly, if a brazing material composed mainly of aluminum is used, thermal stress after the joining is small because joining may be effected at a relatively low temperature.

Beryllium is added, as an active metal, into the brazing material. The content of beryllium in the brazing material may be in such an amount as effectively affording wettability to the brazing material. If the content of beryllium is set at not less than 0.2 wt %, wettability of the brazing material, particularly upon non-oxide type ceramic materials can be largely enhanced. From this point of view, the content of berylium is preferably not less than 1 wt %. Further, the production of an excessive amount of an intermetallic compound can be prevented by setting the content of beryllium to not more than 10 wt %.

A third component needs not but may be incorporated into the brazing material. If a third component is incorporated into the brazing material, at least one kind of Si, Al, Cu and In may be preferably employed from the standpoint of not affording an adverse effect upon the main component. The total compounding amount of the third component is preferably not more than 50 wt %. If it is more than 50 wt %, much intermetallic compound appears in the joining layer after the brazing, so that cracks occurs at the joining interface.

As the ceramic member targeted by the present invention, which is a sintered product, dense alumina or non-oxide type ceramic materials (particularly, aluminum nitride, silicon nitride, silicon carbide) are preferably employed, and aluminum nitride is more preferably employed. If the joined article is to be used under a condition that it may be exposed to a halogen based corrosive gas, a dense alumina member or an aluminum nitride member is preferably used, and an aluminum nitride member is more preferably used.

The main component of the brazing material is aluminum, nickel and/or copper. Assuming that the total weight of the brazing material is 100 wt %, the content of the main component is a remainder obtained by deducting the summed content of beryllium and any third component from 100 wt %. In this case, that one or more kinds of these metals constitute the main component of the brazing material means that one or more kinds of these metals amount to not less than 50 wt % of the brazing material.

If an aluminum nitride member is used as a ceramic member, whereas a brazing material composed of an aluminum alloy is used, it is preferable that 1 to 2 wt % of beryllium and 9 to 12 wt % of silicon are incorporated into the brazing material so as to further enhance wettability of the brazing material, when the total weight of the brazing material is taken as 100 wt %.

Further, before joining, a film made of at least one kind of metal selected from the group consisting of copper, aluminum and nickel may be provided on the surface of a ceramic member or that of another member to be joined to the ceramic member by sputtering, vapor deposition, friction press contacting, plating or the like. Such a film can further enhance the wettability. The thickness of the film composed of at least one kind of these metals is preferably 0.5 $\mu$m to 5 $\mu$m.

As the halogen based corrosive gas, $CF_4$, $NF_4$ and $ClF_3$ may be recited. Among them, particularly $ClF_3$ has a high F radical-dissociating degree, and has the strongest corrosive property at the same temperature under output of plasma. The thickness of the joining layer is preferably not less than 1 $\mu$m but not more than 500 $\mu$m.

As another other member, a ceramic member or a metallic member may be used. As such a ceramic member, dense alumina and the non-oxide type ceramic materials mentioned above is preferably used. As the metallic member, no particular limitation is imposed. However, a nickel member is preferable if a joined article is used as a member to be exposed to the halogen based corrosive gas.

The joined article according to the present invention is preferably used as a member to be exposed to the halogen based corrosive gas, particularly as a member to be arranged in a semiconductor producing apparatus in which the halogen based corrosive gas is used as a film-forming gas or an etching gas.

As such a joined member, mention may be made of positive type devices, for example, a ceramic heater in which a resistive heating element is buried in a substrate of aluminum nitride, an electrostatic ceramic chuck in which electrostatically chucking electrodes are buried in a substrate of aluminum nitride, an electrostatic chuck-provided heater in which a resistive heating element and electrostatically chucking electrodes are buried in a substrate of aluminum nitride, and a high frequency wave generating electrode device in which plasma generating electrodes are buried in a substrate of aluminum nitride.

Further, mention may be made, by way of example, of devices such as dummy wafers, shadow rings, high frequency plasma generating tubes, high frequency plasma generating dooms, high frequency wave permeating windows, infrared beam permeating windows, lift pins for supporting semiconductor wafers, shower plates, etc.

In the present invention, the ceramic member can be joined to another member by melting the brazing material as in the ordinary brazing process. However, the present inventors advanced their investigations, and consequently discovered that when the resulting joined articles were used at high temperatures such as 600° C. for a long time or when the joined articles were subjected to heat cycles between room temperature and 600° C., strength of the joined interfaces of the joined articles was likely to be decreased due to stress remaining there.

Under the circumstances, the present inventors reached a technical idea that a brazing material is interposed between a ceramic member and another member in joining both the members, and the ceramic member is joined to another member by heating at a temperature not higher than the liquid phase line temperature of the brazing material under pressure. As a result, the present inventors succeeded in forming a firmly joining layer at a far lower temperature as compared with the conventional brazing method, remarkably reducing the stress remaining in the joining layer, and improving heat resistance and heat cycling resistance. The pressure in heating at the temperature lower than the liquid phase line temperature is preferably 5 to 50 kg/cm².

EMBODIMENTS OF THE PRESENT INVENTION

In the following, embodiments of various devices to which the present invention is applied will be explained. FIG. 1 is a view for illustrating an example of a holding structure of an electrostatic chuck. In FIG. 1, a reference numeral 1 denotes an electrostatic chuck body made of a discoidal ceramic member. In many case, such an electrostatic chuck with high frequency electrodes is used in an atmosphere of a halogen based corrosive gas. Since it is known that aluminum nitride and alumina have corrosion resistance against such a corrosive atmosphere, a ceramic member is preferably made of aluminum nitride or dense alumina.

Reference numerals 4 and 5 denote an electrode-joining portion and a thermocouple-joining portion, respectively. The detailed structures of the electrtode-joining portion 4 and the thermocouple-joining portion 5 are shown in FIG. 1.

As shown in FIG. 1, a mesh 7 is buried in the electrostatic chuck body 1 near its surface 1a. This mesh 7 may be also used as a resistive heating element for an aluminum nitride heater or an electrostatically chucking electrode.

A hole is formed in the electrostatic chuck body 1, and opened to the rear face 1b of the electrostatic chuck body 1 while a part of the mesh 7 is exposed to a bottom face 8a of the hole 8. A terminal 12 made of a corrosion resistive metal such as nickel is provided with a columnar tip portion 12a having a diameter greater than that of the remaining portion of the terminal 12. A sheet 10A made of a brazing material having a specific composition, an insert member 11 for relaxing residual stress and a sheet 10B made of a brazing material having a specific composition are inserted between the tip face 12b of the tip portion 12a and the bottom face 8a of the hole 8, and the electrode-joining portion 4 is formed by effecting brazing. In FIG. 1 is shown a state before the brazing. The material of the sheet 10A may be the same as or different from that of the sheet 10B.

A hole 9 is further formed in the electrostatic chuck body 1, and opened to the rear face 1a thereof, whereas aluminum nitride is exposed to a bottom face 9a of the hole 9. The hole 9 is shallower than the hole 8. A cap 15 made of nickel is provided around a tip portion 14a of an electrode 14 of a thermocouple, and protects the thermocouple. The outer diameter of the cap 15 is slightly smaller than the inner diameter of the hole 9, so that the cap 15 can be easily inserted into the hole 9 while a given interval is left therebetween.

A sheet 10C made of a brazing material having a specific composition, an insert member 13 and a sheet 10D made of a brazing material having a specific composition are inserted between the tip face of the cap 15 and the bottom face 9a of the hole 9, and the electrode-joining portion 5 is formed by effecting brazing. The material of the sheet 10C may be the same as or different from the sheet 10D.

In the following, specific experimental results will be explained.

Wettability Test for Brazing Materials

Example 1

First, a block (Dimension: 15 mm×15 mm×10 mm) was prepared from aluminum nitride. A sheet made of a brazing material was placed directly on a surface of this block. The brazing material (m.p. 980° C.) composed of 98 wt % of copper and 2 wt % of beryllium was used. With respect to the resulting sample, the block and the brazing material were simultaneously heated, and held at 1000° C. for 30 minutes, followed by cooling. Then, the state of the brazing material on the surface of the block was observed.

Figure 2:
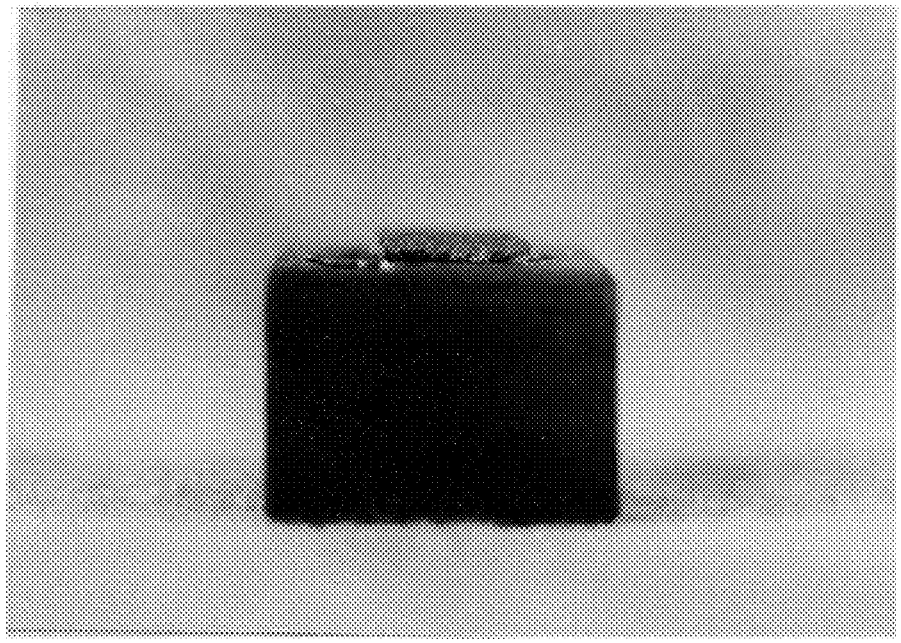
FIG. 2 is a photograph showing a state in which a brazing material composed of 98 wt % of copper and 2 wt % of beryllium was used on a block in a wetting test (Example 1)

FIG. 2 is a photograph showing the state of the block and the brazing material when the brazing material in Example 1 was used. As shown in FIG. 2, when the brazing material composed of 98 wt % of copper and 2 wt % of beryllium was used, the brazing material became flat. This shows that the wettability of the brazing material upon the block was largely enhanced.

Comparative Example 1

Figure 3:
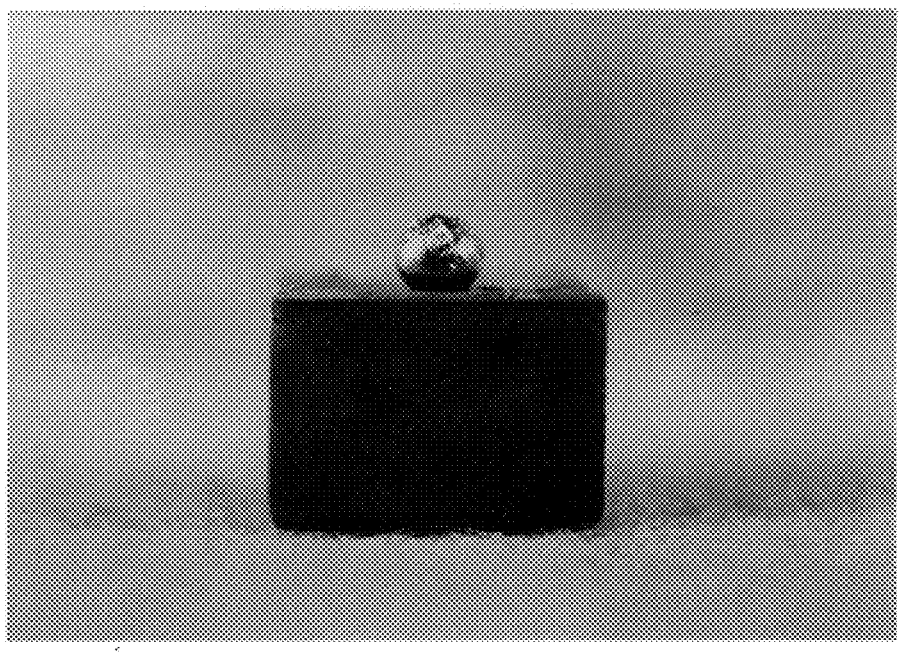
FIG. 3 is a photograph showing a state in which a brazing material composed of 90 wt % of copper and 10 wt % of nickel was used on a block in a wetting test (Comparative Example 1).

Wettability of the brazing material was tested in the same manner as in Example 1. A brazing material (Comparative Example 1, m.p. 1140° C.) composed 90 wt % of copper and 10 wt % of nickel was used. FIG. 3 is a photograph showing the state of the block and the brazing material when the brazing material in Comparative Example 1 was used. As shown in FIG. 3, when the brazing material composed of 90 wt % of copper and 10 wt % of nickel in Comparative Example 1 was used, the brazing material became spherical. This shows that the block was not wetted.

Comparative Examples 2 and 3

A brazing material in Comparative Example 2 (89 wt % of nickel and 11 wt % of phosphorous) or a brazing material in Comparative Example 3 (82 wt % of gold and 18 wt % of copper) were used, and similar experiments were conducted as in Example 1 and Comparative Example 1. As a result, similar results were obtained in Comparative Examples 2 and 3 as in Comparative Example 1.

Comparative Example 4

A surface of a block mentioned above was plated with nickel in a thickness of 10 μm, and a sheet of a brazing material was placed on the thus plated surface of the block. Then, wettability of the brazing material was measured in the same manner as in Example 1. In Comparative Example 4, the brazing material composed of 83 wt % of gold and 18 wt % of copper was used. As a result, a similar result was obtained as in Comparative Example 1.

Comparative Example 5

A surface of a block mentioned above was plated with nickel in a thickness of 10 μm, and a sheet of a brazing material was placed on the thus plated surface of the block. Then, wettability of the brazing material was measured as in Example 1. In Comparative Example 5, the brazing material composed of 90 wt % of copper and 10 wt % of nickel was used. As a result, a similar result was obtained as in Comparative Example 1.

Corrosion Resistance Test Against a Halogen Based Corrosive Gas

About 1 mg of each of brazing materials shown in Table 1 was prepared, and exposed to $ClF_3$ (0.1 torr) at 450° C. for 2 hours. With respect to each brazing material, the weight was measured before and after the exposure. Results are shown in Table 1.

TABLE 1

|  | Composition of brazing material | Weight (g) before exposure | Weight (g) after exposure | Change (mg) in weight |
| --- | --- | --- | --- | --- |
| Comparative Example 7 | Ag | 0.9559 | 0.9538 | −2.1 |
| Comparative Example 8 | Ag-2% Ti | 0.9654 | 0.9629 | −1.6 |
| Comparative Example 9 | Au | 0.8640 | 0.8613 | −2.7 |
| Example 2 | Cu-2% Be | 0.9338 | 0.9388 | 0.0 |
| Example 3 | Ni-2% Be | 1.1052 | 1.1051 | 0.0 |

In each of Comparative Examples 7, 8 and 9, the weight reduction was conspicuous. To the contrary, the brazing materials in Examples 2 and 3 suffered no weight reduction even after the exposure against $ClF_3$.

Joining Test

Example 4

Two blocks (Dimension: 7 mm×40 mm×20 mm) were prepared from aluminum nitride. A sheet of a brazing material (Dimension: 7 mm×40 mm×100 μm) was interposed between a pair of the blocks. The brazing material (m.p. 980° C.) composed of 98 wt % of copper and 2 wt % of beryllium was used. With respect to the resulting sample, the block and the brazing material were simultaneously heated up to 1000° C., and held at 1000° C. for 30 minutes, followed by cooling. At that time, pressurizing was not effected.

With respect to the thus obtained joined article, bending strength was measured to be 130 MPa according to JIS R 1624.

Example 5

A joined article was produced in the same manner as in Example 4, provided that the block and the brazing material were simultaneously heated up to 900° C. under application of pressure of 50 kg/cm$^2$, and held at 900° C. under application of pressure of 50 kg/cm$^2$ for 30 minutes. Then, the joined article was cooled after the pressure was removed. The thus obtained joined body had bending strength of 160 MPa.

As mentioned above, according to the present invention, the brazing material having high wettability upon the ceramic members can be offered, and the joined articles which have high corrosion resistance against various corrosive materials, particularly the halogen based corrosive gases, and can maintain strength and gas tightness of the joined articles even if used under a corrosive circumstance for a long time period can be offered.

What is claimed is:

1. A joined article comprising a ceramic member, another member, and a joining layer that is formed between the ceramic member and said another member and is directly attached to both members, said joining layer consisting of a single layer of a brazing material and comprising not less than 50% by weight of nickel, and said joining layer containing beryllium as an activating component.

2. The joined article set forth in claim 1, wherein the ceramic member is joined to said another member under pressure by heating the brazing material at not more than a liquid phase liquid temperature of the brazing material.

3. The joined article set forth in claim 1, wherein the ceramic member comprises a non-oxide type ceramic material.

4. The joined article set forth in claim 3, wherein said non-oxide type ceramic material is aluminum nitride.

5. The joined article set forth in claim 1, wherein said another member is nickel.

6. A process for producing a joined article, comprising the steps of interposing a brazing material between a ceramic member and another member, and directly attaching both members to the brazing material by heating to form a joining layer, wherein said joining layer consists of a single layer and comprises not less than 50% by weight of nickel, and said joining layer contains beryllium as an active component.

7. The joined article-producing process set forth in claim 6, wherein the ceramic member is joined to said another member under pressure by heating the brazing material at not more than a liquid phase liquid temperature of the brazing material.

8. The joined article-producing process set forth in claim 6, wherein the ceramic member comprises a non-oxide type ceramic material.

9. The joined article-producing process set forth in claim 8, wherein said non-oxide type ceramic material is aluminum nitride.

10. The joined article-producing process set forth in claim 7, wherein said another member is nickel.

* * * * *